United States Patent
Williams et al.

(10) Patent No.: US 8,058,824 B2
(45) Date of Patent: Nov. 15, 2011

(54) ELECTRIC MOTOR CONTROL

(75) Inventors: Connel Brett Williams, Leamington Spa (GB); Christopher David Dixon, Coventry (GB); Jiang Li, Birmingham (GB)

(73) Assignee: TRW Limited, West Midlands (GB)

( * ) Notice: Subject to any disclaimer, the term of this patent is extended or adjusted under 35 U.S.C. 154(b) by 531 days.

(21) Appl. No.: 12/086,837

(22) PCT Filed: Dec. 21, 2006

(86) PCT No.: PCT/GB2006/004870
§ 371 (c)(1),
(2), (4) Date: Mar. 27, 2009

(87) PCT Pub. No.: WO2007/072025
PCT Pub. Date: Jun. 28, 2007

(65) Prior Publication Data
US 2009/0218965 A1   Sep. 3, 2009

(30) Foreign Application Priority Data
Dec. 23, 2005   (GB) .................................. 0526274.6

(51) Int. Cl.
*H02P 6/00* (2006.01)
(52) U.S. Cl. .................. 318/265; 318/286; 318/400.02; 318/400.32
(58) Field of Classification Search .................. 318/265, 318/286, 400.02, 400.32
See application file for complete search history.

(56) References Cited

U.S. PATENT DOCUMENTS

| | | | | |
|---|---|---|---|---|
| 5,701,066 | A | * | 12/1997 | Matsuura et al. ............. 318/808 |
| 7,034,497 | B2 | * | 4/2006 | Markunas et al. ....... 318/400.33 |
| 2004/0249596 | A1 | * | 12/2004 | Ho ................................. 702/106 |
| 2004/0263114 | A1 | * | 12/2004 | Kaneko et al. ................ 318/811 |
| 2005/0030002 | A1 | * | 2/2005 | Shao et al. .................. 324/76.77 |
| 2005/0093505 | A1 | * | 5/2005 | Kameya ...................... 318/805 |
| 2005/0151502 | A1 | * | 7/2005 | Quirion ........................ 318/715 |
| 2005/0269982 | A1 | | 12/2005 | Coles et al. |
| 2006/0091845 | A1 | * | 5/2006 | Consoli et al. ................ 318/701 |

OTHER PUBLICATIONS

Parasiliti F. et al., "Sensorless speed control of a PM synchronous motor by sliding mode observer"; Industrial Electronics, 1997. ISIE '97., Proceedings of the IEEE International Symposium on Guimaraes, Portugal Jul. 7-11, 1997, New York, NY, USA, IEEE, US, pp. 1106-1111, XP010264987 ISBN: 0-7803-3936-3.

(Continued)

*Primary Examiner* — Thomas Dougherty
*Assistant Examiner* — Bryan Gordon
(74) *Attorney, Agent, or Firm* — MacMillan, Sobanski & Todd, LLC

(57) ABSTRACT

A control system for an electric motor is arranged to determine the position of the motor from at least one electrical parameter by means of a position determining algorithm which is reliant on movement of the motor to determine the motor position, and to start up the motor from rest by applying voltages to the motor that are independent of the position of the motor.

15 Claims, 10 Drawing Sheets

OTHER PUBLICATIONS

Parasiliti F. et al, "Sensorless speed control of a PM synchronous motor based on sliding mode observer and extended Kalman filter"; Conference Record of the 2001 IEEE Industry Applications Conference. 36th IAS Annual Meeting. Chicago, Il. Sep. 30-Oct. 4, 2001, Conference Record of the IEEE Industry Applications Conference. IAS Annual Meeting, New York, NY.: IEEE, US, vol. 1 of 4. Conf. 36, pp. 533-540, XP010561753 ISBN: 0-7803-7114-3.

Hossain S. et al., "Four quadrant and zero speed sensorless control of a switched reluctance motor"; Conference Record of the 2002 IEEE Industry Applications Conference. 37th IAS Annual Meeting. Pittsburgh, PA., Oct. 13-18, 2002, Conference Record of the IEEE Industry Applications Conference. IAS Annual Meeting New York, NY: IEEE, US, vol. 1 of 4, Conf. 37, pp. 1641-1646, XP010610099 ISBN: 0-7803-7420-7.

* cited by examiner

State 1 : [100]

State 2 : [110]

State 3 : [010]

State 4 : [011]

State 5 : [001]

State 6 : [101]

State 0 : [000]

State : 7 [111]

US 8,058,824 B2

ELECTRIC MOTOR CONTROL

CROSS-REFERENCE TO RELATED APPLICATIONS

This application is the National Stage of International Application No. PCT/GB2006/004870 filed Dec. 21, 2006, the disclosures of which are incorporated herein by reference in their entirety, and which claimed priority to Great Britain Patent Application No. 0526274.6 filed Dec. 23, 2005, the disclosures of which are incorporated herein by reference in their entirety.

BACKGROUND OF THE INVENTION

This invention relates to electric motors, and in particular to the position sensorless control of electric motors.

It is known to use motor control methods that use an algorithm to estimate the motor position rather than using a position sensor. However, many of these sensorless algorithms do not operate well at low motor speeds. Those that can operate at low or zero speeds are significantly more complex than those that only operate at higher speeds. However in some applications, such as fans and pumps, including hydraulic pumps for power steering systems, there is a need to produce relatively low cost systems that avoid the cost of a position sensor and the complication of known zero speed position determining algorithms.

BRIEF SUMMARY OF THE INVENTION

Accordingly the present invention provides a control system for an electric motor, the control system being arranged to determine the position of the motor from at least one electrical parameter by means of a position determining algorithm which is reliant on movement of the motor to determine the motor position, and to start up the motor from rest by applying voltages to the motor that are independent of the position of the motor.

The position determining algorithm may be active for controlling the motor over all speeds, indeed it is preferably active at speeds down to zero. Preferably it is modified at low speeds. For example it may be modified so as to control the direction in which the motor turns, or it may be modified to prevent a term within the algorithm from tending towards infinity at zero speed.

Other advantages of this invention will become apparent to those skilled in the art from the following detailed description of the preferred embodiments, when read in light of the accompanying drawings.

BRIEF DESCRIPTION OF THE DRAWINGS

FIG. 12 is a graph showing limits on a position correction factor in the system of FIG. 1; and.

DETAILED DESCRIPTION OF THE INVENTION

Figure 1:
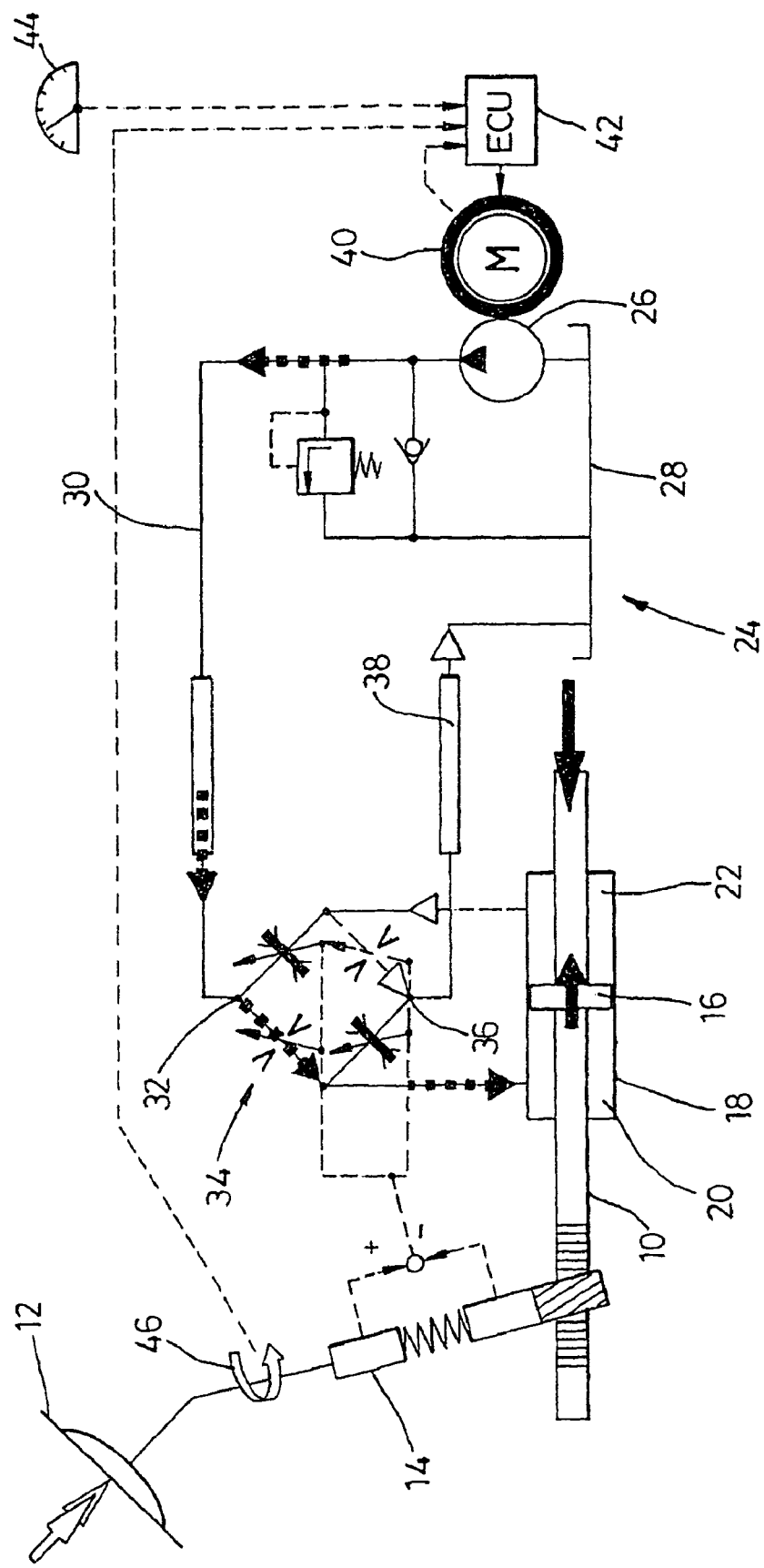
FIG. 1 shows a power steering system according to an embodiment of the invention.

Referring to FIG. 1, an electro-hydraulic power steering system comprises a steering rack 10 arranged to be moved to the left and right to control the steering angle of the front wheels of a vehicle in conventional manner. The rack is moved primarily by driver input to the steering wheel 12 which is connected to the steering rack 10 by a steering column 14. Power assistance is provided by means of a two-sided piston 16 mounted on the steering rack 10 and movable in a cylinder 18. The piston divides the cylinder into two chambers 20, 22. The pressure of hydraulic fluid in the two hydraulic chambers 20, 22 is controlled by a hydraulic circuit 24 to control the direction and magnitude of the power assistance force applied to the steering rack 10.

The hydraulic circuit comprises a pump 26 arranged to pump hydraulic fluid under pressure from a reservoir 28 to a feed line 30. The feed line is connected to an inlet port 32 of a pressure control valve 34, which is represented functionally in FIG. 1. An outlet port 36 of the pressure control valve 34 is connected via a return line 38 to the reservoir 28. The pressure control valve 34 is arranged to connect either the left or right hydraulic chamber 20, 22 to the feed line 30 and the other chamber 20, 22 to the return line depending on which direction steering torque is applied to the steering wheel 12. It is also arranged to control the fluid pressure applied to the hydraulic chambers 20, 22 to control the level of hydraulic power assistance depending on the steering torque being transmitted from the steering wheel 12 to the rack 10 through the steering column 14. The pressure in the hydraulic chambers 20, 22 is clearly determined by the speed of the pump 26 as well as the state of the pressure control valve 34.

The pump 26 is driven by a motor 40 which is controlled by a control unit 42. The control unit 42 receives an input signal from a vehicle speed sensor 44 which is variable with vehicle speed, and an input signal from a steering rate sensor 46 which varies with the steering rate, i.e. the rate of rotation of the steering wheel 12. The control unit 42 controls the speed of the pump 26 on the basis of these inputs. This system is therefore referred to as a speed control system.

Figure 2:
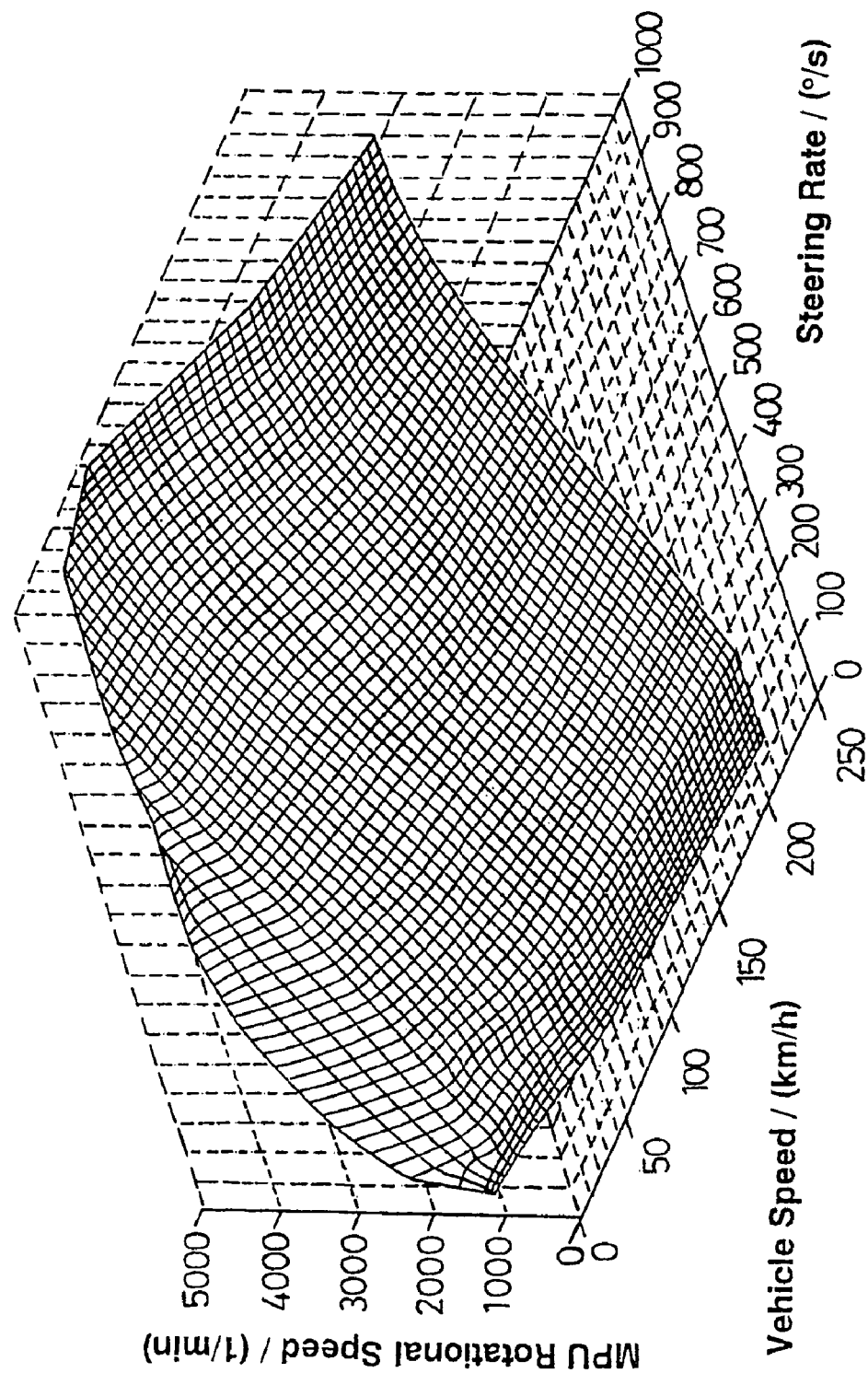
FIG. 2 is a graph of the speed control function of an electric motor of the system of FIG. 1.

Referring to FIG. 2, the speed of the motor 40, and hence the pump 26, is generally arranged to increase with steering rate, and decrease with increasing vehicle speed.

Figure 3:
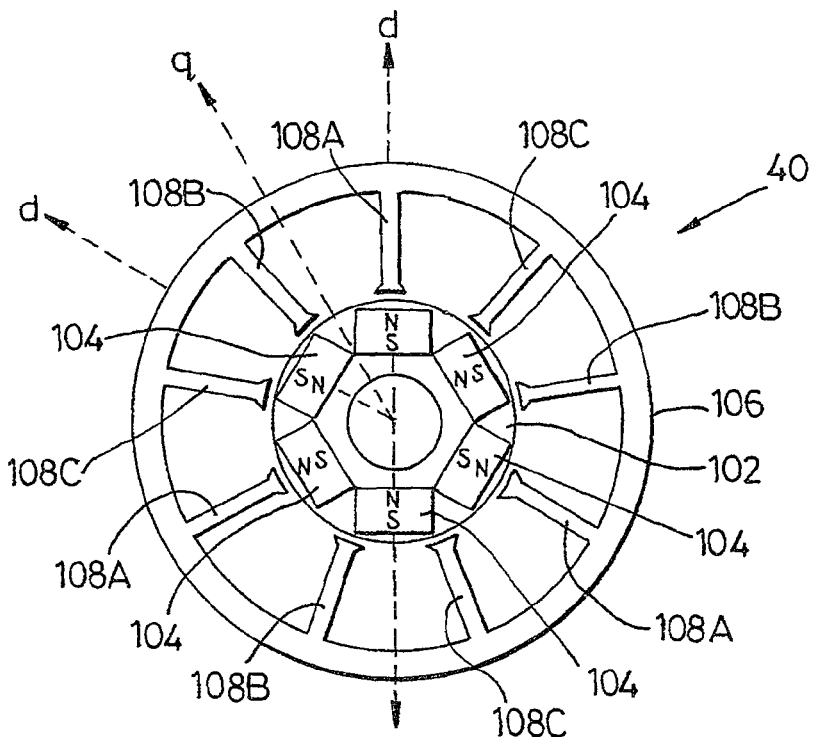
FIG. 3 is a diagram of an electric motor of the system of FIG. 1.

Referring to FIG. 3, the motor 40 is a three phase electrically commutated sinusoidal AC brushless permanent magnet synchronous motor which comprises a rotor 102 having, for example, six magnets 104 mounted on it, which in this instance are arranged so as to provide six poles which alternate between north and south around the rotor. The rotor 102 therefore defines three direct or d axes evenly spaced around the rotor and three quadrature or q axes interspaced between the d axes. The d axes are aligned with the magnetic poles of the magnets 104 where the lines of magnetic flux from the rotor are in the radial direction, and the q axes are spaced between the d axes where the lines of magnetic flux from the rotor are in the tangential direction. As the rotor rotates, the directions of the d and q axes clearly rotate with it.

A stator 106 in this particular embodiment comprises, for example, a nine slot copper wound element having three groups 108A, 108B, 108C of three teeth, each group of teeth having a common winding forming a respective phase. There are therefore three electrical cycles in each full rotation of the rotor, and the three teeth in any phase 108A, 108B, 108C are always in the same electrical position as each other.

Figure 4:
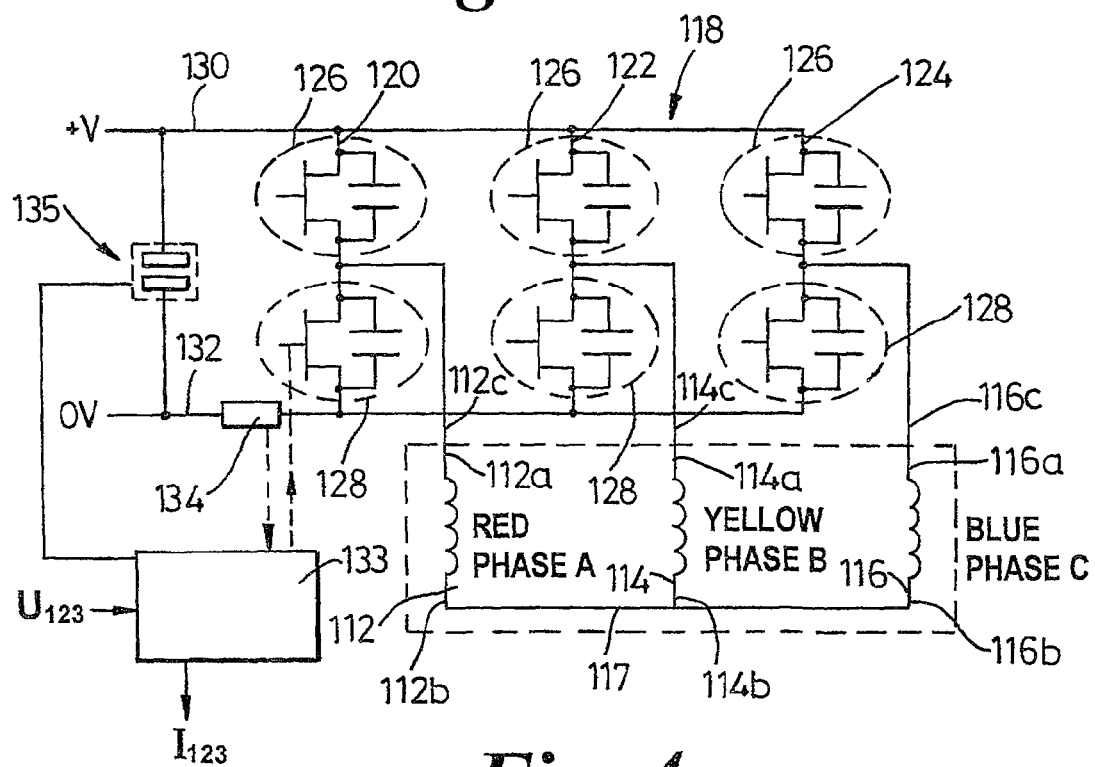
FIG. 4 is diagram of a drive circuit for the motor of FIG. 3.

Referring to FIG. 4, the three motor windings 112, 114, 116, generally designated as phases A, B and C, are connected in a star network. In other embodiments, other arrangements, such as delta networks, can be used. The phase windings are coiled around the stator teeth 108A, 108B, 108C respectively. One end 112a, 114a, 116a of each coil is connected to a respective terminal 112c, 114c, 116c. The other ends 112b, 114b, 116b, of the coils are connected together to form the star centre 117. A drive circuit comprises a three-phase bridge 118. Each arm 120, 122, 124 of the bridge comprises a pair of switches in the form of a top transistor 126 and a bottom transistor 128 connected in series between a supply rail 130 and ground line 132. A DC link voltage is applied between the supply rail 130 and the ground line 132. The motor windings 112, 114, 116 are each tapped off from between a respective complementary pair of transistors 126, 128. The transistors 126, 128 are turned on and off in a controlled manner by a drive stage controller 133 within the control unit 42 to provide pulse width modulation (PWM) of the potential applied to each of the terminals 112c, 114c, 116c, thereby to control the potential difference applied across each of the windings 112, 114, 116 and hence also the current flowing through the windings. This in turn controls the strength and orientation of the magnetic field produced by the windings, and hence the torque and speed of the motor.

A current measuring device in the form of a resistor 134 is provided in the ground line 132 between the motor 40 and ground so that the controller 42 can measure the total current flowing though all of the windings 112, 114, 116. In order to measure the current in each of the windings the total current has to be sampled at precise instants within the PWM period where the voltage applied to each terminal of the winding (and hence the conduction state of a particular phase) is known. As is well known, in order for the currents in each of the windings to be measured in any one PWM period, the drive circuit needs to be in each of at least two different active states for a predetermined minimum time. The drive stage controller 133 can determine the phase currents from the voltages across the resistor 134 measured at different times in the PWM period.

A DC link voltage sensor 135 is arranged to measure the DC link voltage across the drive circuit, i.e. between the supply rail 130 and the ground line 132. The drive stage controller 133 receives an input from this voltage sensor 135. From this input the controller is arranged to measure the phase voltages in the motor. In order to do this, the controller 133 determines the modulation duty cycle of each motor phase, i.e. the proportion of each PWM period for which the phase is connected to the supply rail, and multiplies this by the measured DC link voltage. This gives a measure of the phase voltage for each phase.

The control unit 42 is arranged to determine the phase voltages of the motor that will produce the required motor currents and to input these voltages to the drive stage controller 133. The drive stage controller 133 is arranged to control the transistors of the drive stage to produce the required phase voltages as will now be described.

Figure 5:
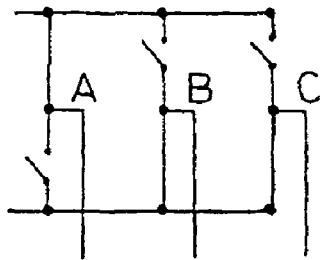
FIG. 5 is a diagram showing the different electrical states of the drive circuit of FIG. 3
Figure 5:
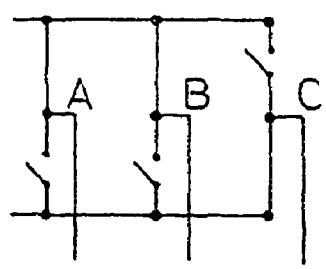
Figure 5:
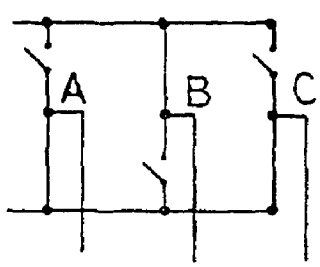
Figure 5:
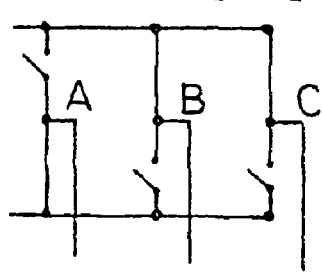
Figure 5:
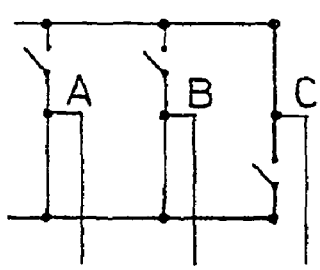
Figure 5:
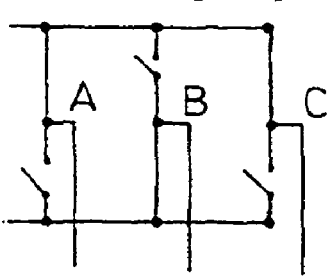
Figure 5:
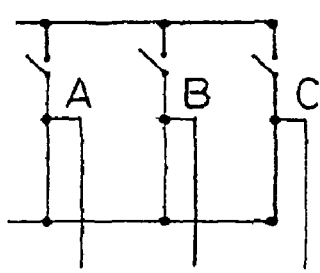
Figure 5:
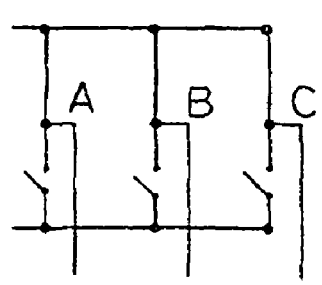

Referring to FIG. 5, each winding 102, 104, 106 in a three-phase system can only be connected to either the supply rail 120 or the ground line 122 and there are therefore eight possible states of the control circuit. Using 1 to represent one of the phases being at positive voltage and 0 to represent a phase connected to ground, state 1 can be represented as [100] indicating phase A at 1, phase B at 0 and phase C at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 102, 104, 106, flowing in one direction through one of them and in the other direction through the other two. State 0 is a zero volt state in which all of the windings are connected to ground and state 7 is a zero volt state in which all the windings are connected to the supply rail.

States 1, 2, 3, 4, 5 and 6 are herein also referred to as states +A, −C, +B, −A, +C and −B respectively, because they each represent the states in which the voltage applied across the windings is in a positive or negative direction for a respective one of the phases. For example in the +A state the A phase is connected to the supply rail and the other two phases are connected to the ground link, and in the −A state the connections are reversed.

When the circuit is being controlled to produce PWM, each of the phases will normally be turned on and off once in each PWM period. The relative lengths of time that are taken up in each state will determine the magnitude and direction of the magnetic field produced in each winding, and hence the magnitude and direction of the total torque applied to the rotor. These lengths of time, or duty ratios, can be calculated using various modulation algorithms but in this embodiment a space vector modulation technique is used.

Figure 6:
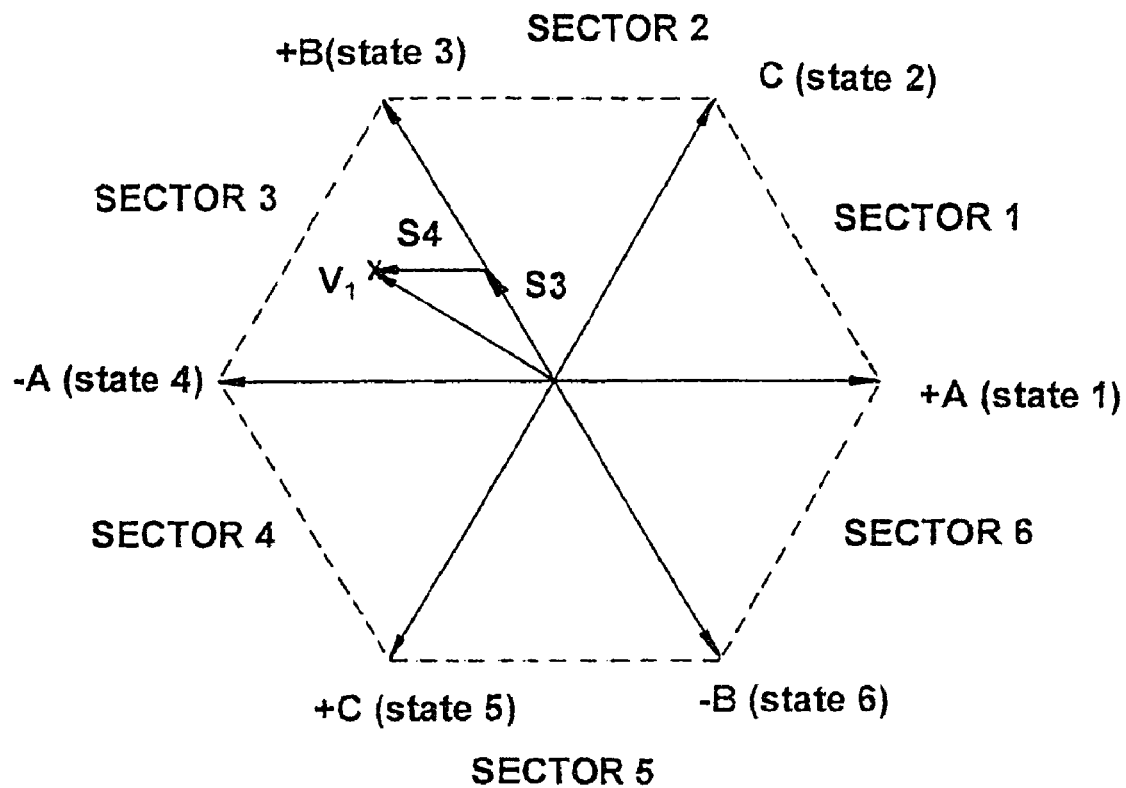
FIG. 6 is a space vector diagram used to determine the states of the drive circuit which are required to produce a desired motor output.

Referring to FIG. 6, in space vector modulation systems, the times in each PWM period spent in each of the states are represented as state vectors in a space vector modulation (SVM) diagram. In this type of diagram, single state vectors are those in the directions of the vectors S1 to S6, and the length of the vectors in each of these directions represents the amount of time in each PWM period spent in the respective state. This means that any desired voltage in the windings can be represented as a point on the diagram which corresponds to a voltage vector which represents the magnitude and direction of the voltage, and can be produced by a combination of state vectors S1, S2, etc. the lengths of which represent the time in each PWM period spent in that state. For example, the desired voltage vector $V_1$ can be represented as the sum of vectors S3 and S4. As the motor rotates, the direction of the desired vector will change, so the vector will rotate about the centre of the diagram, the length of the vector also changing as the required torque from the motor changes.

Figure 7:
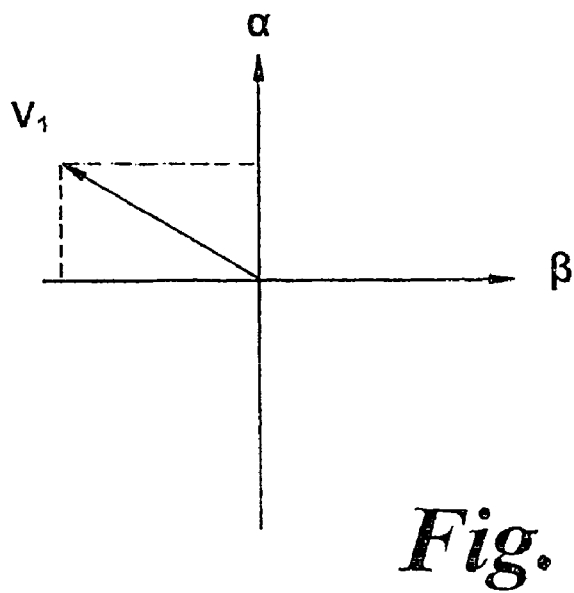
FIG. 7 shows the components of motor phase voltages in the motor of FIG. 3.

Referring to FIG. 7, the desired voltage from the stator windings can also be expressed in terms of two components, one in each of two orthogonal directions α, β. It will be appreciated from FIG. 3 that the motor goes through three electrical cycles for each complete rotation of the rotor 102. In each electrical cycle the demanded voltage vector will rotate around the state vector diagram once. The directions of the α and β components are therefore spaced apart by the same angle as the d and q axes, with the α and β components defining the voltage vector relative to the stator and the d and q components defining the voltage vector relative to the rotor. Provided the rotor position is know, the voltage as defined in any one of the d/q, α/β or A/B/C components can be converted to any of the others.

Figure 8:
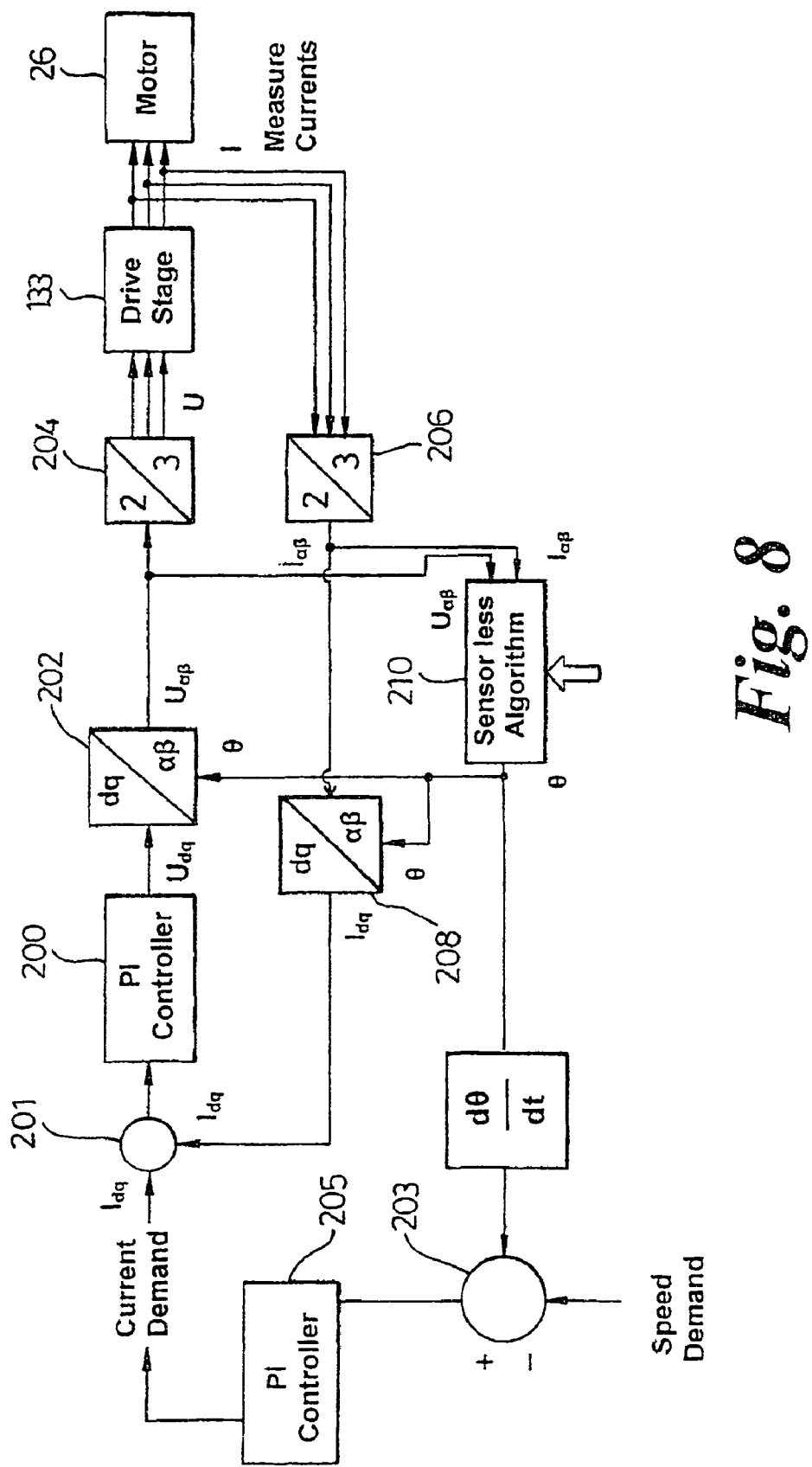
FIG. 8 is a functional block diagram of the motor and control unit of FIG. 1.

Referring to FIG. 8, the operation of the control unit 42 will now be described in more detail. The required rotational speed of the motor, as derived from the plot of FIG. 2, compared to the measured rotational speed by means of a comparator 203. The difference between the two is input to a PI controller 205 which calculates the motor current required to reduce this difference, and outputs a corresponding current demand $I_{dq}$ The demanded current components $I_{dq}$ are compared with corresponding measured d and q axis currents, and the difference measured by a comparator 201. Two PI (proportional/integral) controllers 200 (only one of which is shown) are arranged to use the difference between the measured and demanded d and q axis currents to determine the required d and q axis voltages $U_{dq}$. A dq/αβ converter 202 converts the d and q axis voltages to α and β axis voltages $U_{αβ}$, using motor position as an input. The motor position is determined using a sensorless algorithm as described below. A further converter 204 converts the α and β axis voltages to desired phase voltages Uabc for the three motor phases. These phase voltages are input to the drive stage controller 133 which controls the drive stage 118 as described above to achieve the desired phase voltages.

The three measured phase currents $I_{abc}$, in this case as measured using the single current sensor 134, are input to a first current converter 206 which converts them to α and β axis currents $I_{αβ}$. These are then input to a second current converter 208, together with the motor position, and the second current converter 208 converts them to d and q axis currents $I_{dq}$. These measured d and q axis currents are used for comparison with the demanded d and q axis currents as described above.

Figure 9:
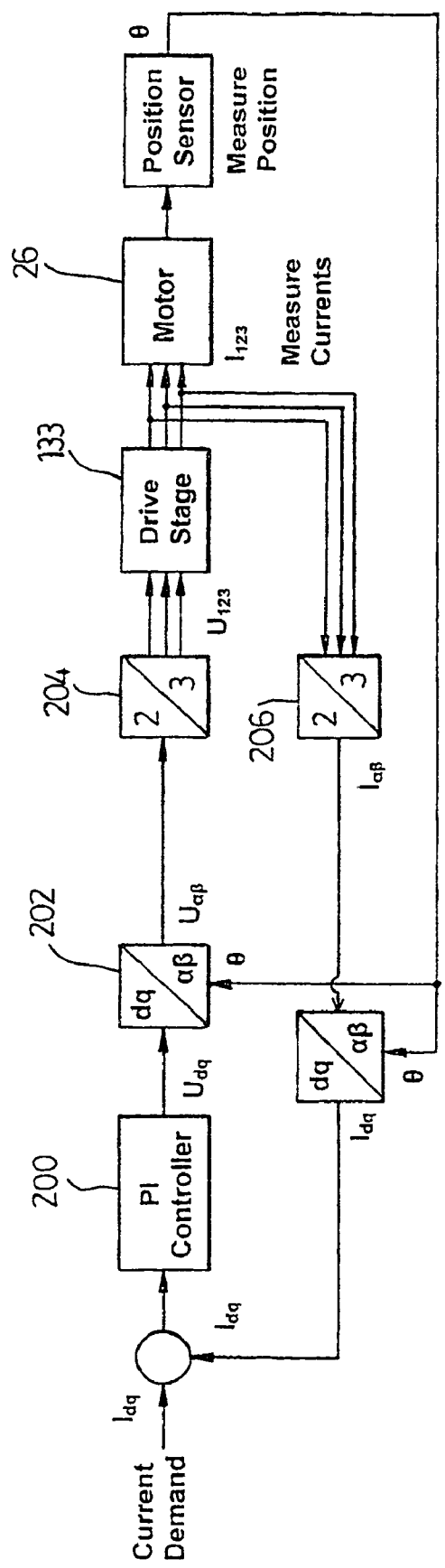
FIG. 9 is a functional block diagram of a motor and control unit of a known system using a motor position sensor.

For reference, a system in which a motor position sensor is used instead of the position determining algorithm is shown in FIG. 9.

Figure 10:
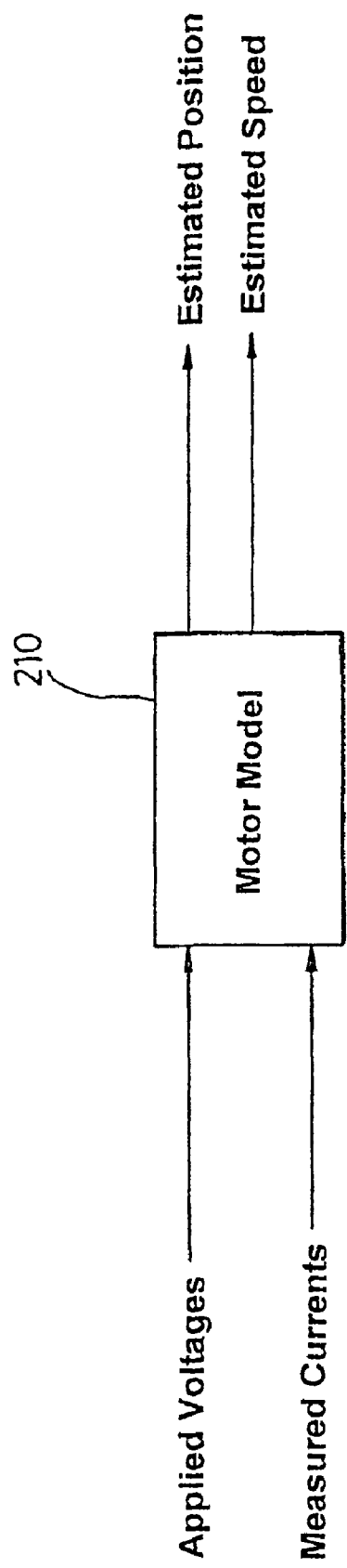
FIG. 10 shows the inputs and outputs of the sensorless algorithm of FIG. 8.
Figure 11:
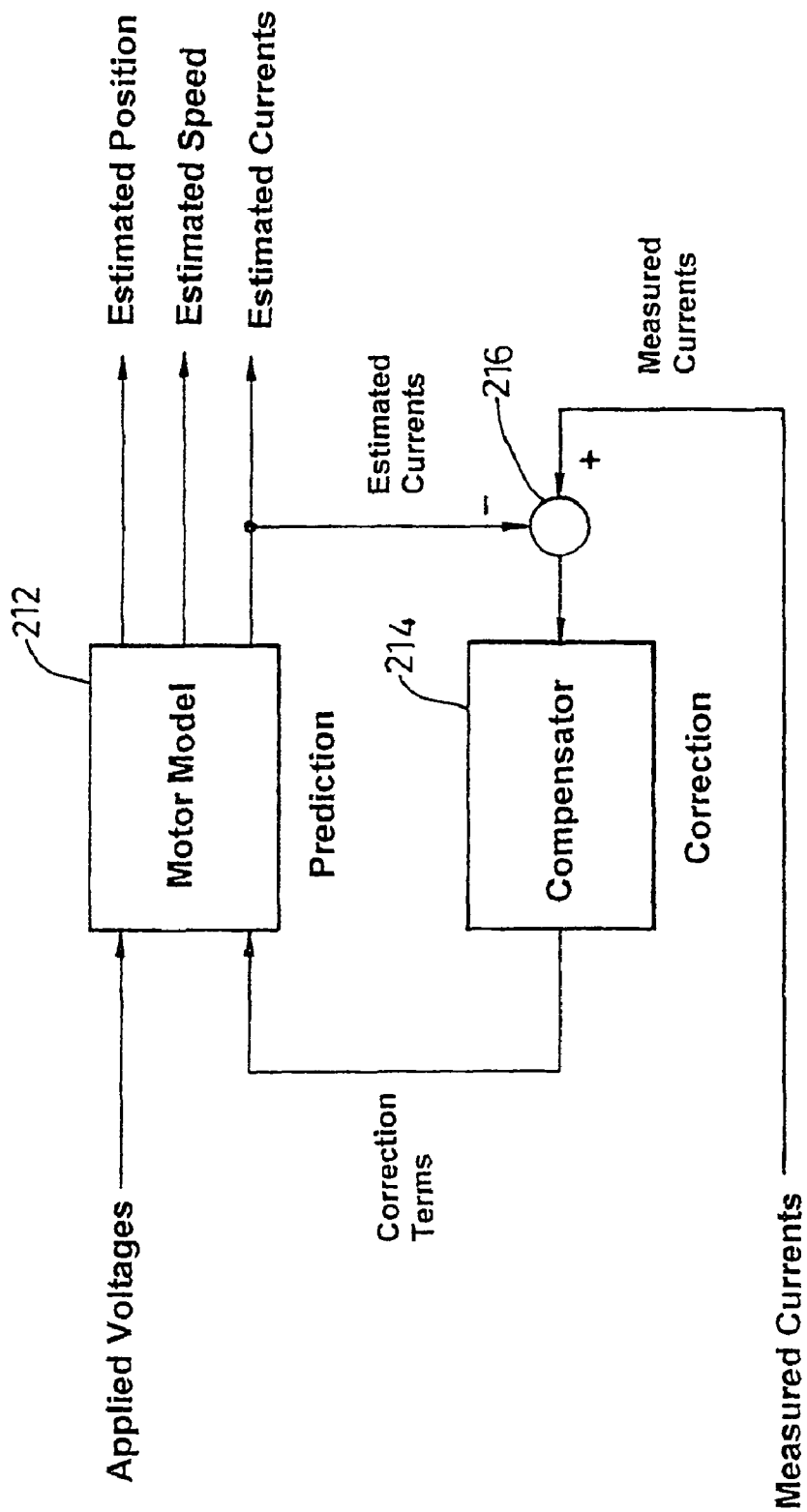
FIG. 11 shows the inputs and outputs of separate parts of the sensorless algorithm of FIG. 10.

Referring to FIG. 10, a sensorless motor position determining algorithm 210 is arranged to receive as inputs the applied voltages, in this case in the form of α and β axis voltages, and the measured currents, in this case in the form of the α and β axis currents. The sensorless algorithm comprises a model of the motor, and produces from the inputs estimates of motor position and motor speed. H Referring to FIG. 11, the algorithm in this case is a predictor-corrector or observer type algorithm. It includes a predictor 212 and a compensator or observer 214. The predictor 212 includes a model of the motor, and optionally other parts of the system, which includes definitions of its motor electrical parameters, such as resistance and inductance, and also the physical parameters such as inertia and damping. The model is defined as a series of equations, which derive model outputs from model inputs. The model is arranged to receive as inputs the applied voltages. It produces as outputs estimates for various parameters or states of the motor, specifically motor position and motor speed and the currents in the motor. The estimated currents are compared with the measured currents in a comparator 216 and the difference between the two is input as an error or residual signal to the compensator 214. The compensator 214 derives, from the residual, a correction factor for each of the motor states which is arranged to minimize the current residual, and hence to reduce the error in the position estimation. The correction terms output by the compensator 214 are input to the predictor 212 which corrects the states accordingly. The compensator 214 therefore provides a closed loop feedback for the predictor that enables the states, for example the position and speed, defined by model, to be corrected. This makes the sensorless algorithm robust to measurement and model errors.

The following equation represents in general terms the operation of the observer, which in this case is a non-linear observer to accommodate the non-linear terms in the model of the motor. The state estimates (motor phase currents, rotor position and rotor speed) are represented by $\hat{x}$, and the measured phase voltages by u. The motor and system dynamics are represented by the non-linear functions A and B. The actual states are represented by x, so the residuals are represented by $(x-\hat{x})$, and the corrector by the non-linear function C.

$$\dot{\hat{x}} = A\hat{x} + Bu + C(x-\hat{x})$$

The equations for the non-linear observer in this example are:

$$\frac{d\hat{i}_\alpha}{dt} = -\frac{R}{L}\hat{i}_\alpha + \frac{k_e\hat{\omega}_m}{\sqrt{3}L}\sin(\hat{\theta}_e) + \frac{1}{L}u_\alpha + corr_\alpha \quad (1)$$

$$\frac{d\hat{i}_\beta}{dt} = -\frac{R}{L}\hat{i}_\beta - \frac{k_e\hat{\omega}_m}{\sqrt{3}L}\cos(\hat{\theta}_e) + \frac{1}{L}u_\beta + corr_\beta \quad (2)$$

$$\frac{d\hat{\omega}_m}{dt} = \frac{k_t}{J}\hat{i}_q - \frac{B}{J}\hat{\omega}_m + corr_\omega \quad (3)$$

$$\frac{d\hat{\theta}_e}{dt} = p\hat{\omega}_m + corr_\theta \quad (4)$$

The following correction terms are used in the observer:

$$corr_\alpha = g_i(i_\alpha - \hat{i}_\alpha) \quad (5)$$

$$corr_\beta = g_i(i_\beta - \hat{i}_\beta) \quad (6)$$

$$corr_\omega = -g_\omega \frac{\sqrt{3}L}{k_e}(i_q - \hat{i}_q) \quad (7)$$

$$corr_\theta = g_\theta \frac{\sqrt{3}L}{k_e} \frac{1}{\hat{\omega}_m}(i_d - \hat{i}_d) \quad (8)$$

where:

$$\hat{i}_d = \hat{i}_\alpha \cos(\hat{\theta}_e) + \hat{i}_\beta \sin(\hat{\theta}_e) \quad (9)$$

$$\hat{i}_q = \hat{i}_\alpha \sin(\hat{\theta}_e) + \hat{i}_\beta \cos(\hat{\theta}_e) \quad (10)$$

The terms in these equations are defined as follows:
(α,β)=stator (fixed) reference frame
(d,q)=rotor reference frame
$i_\alpha$, $i_\beta$=motor currents
$u_\alpha$, $u_\beta$=motor voltages
$\theta_e$=motor electrical angle (radians electrical)
$\omega_m$=motor mechanical angular velocity (radians mechanical per second)
R=motor phase resistance
L=motor inductance (phase self-inductance plus mutual inductance)
B=motor mechanical viscosity
J=motor mechanical inertia
$k_e$=motor back emf constant (as defined below)
$k_t$=motor torque constant (as defined below)
p=number of pole pairs for the motor
$g_i$, $g_w$, $g_\theta$=observer gains (tuneable parameters)

The motor back-emf and torque constants are defined as follows:
$k_e$=peak line-to-line voltage/mechanical angular velocity
$k_t$=average motor torque/peak motor current
The symbol ^ above a quantity indicates that it is an estimated value as opposed to a measured value.

The values for each of the variables are obtained as follows:
$i_\alpha$, $i_\beta$ are derived from the measured phase currents as described above;
$u_\alpha$, $u_\beta$ are derived from the measured phase voltages;
$\theta_e$ is the variable being determined from the algorithm;
$\omega_m$ is an internal state of the observer. Externally of the observer, the angular velocity is determined by differentiating the motor position state $\theta_e$ of the observer;
R, L, B, and J are defined as constants;
$k_e$ and $k_t$ are defined as indicated above and determined using off-line measurements;
p is the number of motor pole pairs, which is a known constant.

The fact that the controller is arranged to derive the motor speed from the differential of the estimated position has the advantage that, providing the rotor is turning and the system has reached a steady state equilibrium, the accuracy of the speed signal for the speed control of the motor is determined only by the accuracy of the clock of the microprocessor in the controller that is running the algorithm.

The sensorless position determining algorithm described above determines rotor position by monitoring an electrical parameter of the motor that varies with rotational position. Specifically it estimates the phase angle of the rotor back-emf, which in turn is the derivative of rotor flux and varies with the rotational position of the motor. Since the magnitude of the rotor back-emf is zero at zero motor speed, the observer cannot estimate position at zero motor speed. Another problem with the algorithm at zero speed is that the position correction term corro includes the inverse of the motor angular velocity. This term therefore becomes infinite at zero motor speed. However, by modifying the sensorless algorithm at low motor speeds it can be made to function sufficiently well to start the motor, even though it will generally not operate efficiently. This is acceptable for applications where the motor is not required to produce high torques at low speeds, which is the case for the hydraulic pump of this embodiment, and other applications including pumps and fans. Modification of the sensorless algorithm to provide a startup algorithm forces the motor to rotate in the correct direction even though the actual motor position is unknown. As the speed increases, the sensorless algorithm can be changed to its normal operation.

Many sensorless position observers, including the non-linear observer of this embodiment, have two possible solutions for the position estimation: the correct estimation, and an incorrect estimation 180° out of phase. One purpose of the startup algorithm is to ensure that the observer does not converge at the incorrect state. If it does converge on the incorrect state, there is a position error of 180° which will result in incorrect operation of the motor. Either the motor will run backwards, or it will run in correct direction but with very low output torque and efficiency. (The actual operation for 180° error is determined by the design of the motor controller).

To prevent this, the position correction calculation in equation (8) is replaced by:

$$corr_\theta = g_\theta \frac{\sqrt{3}\, L}{k_e} F(\hat{\omega}_m)(i_d - \hat{i}_d) \quad (11)$$

where $F(\hat{\omega}_m)$ is a function that calculates the reciprocal of $\hat{\omega}_m$ and limits its value to prevent it from going to infinity. $F(\hat{\omega}_m)$ is calculated as follows:

if $\hat{\omega}_m > 0$
$\quad\hat{\omega}_{m\_lim} = \text{LIMIT}(\hat{\omega}_m, +\min\_\omega, +\infty)$
endif
if $\hat{\omega}_m < 0$
$\quad\hat{\omega}_{m\_lim} = \text{LIMIT}(\hat{\omega}_m, -\infty, -\min\_\omega)$
endif
$F(\hat{\omega}_m) = 1 / \hat{\omega}_{m\_lim}$ This limits the magnitude of $\hat{\omega}_{m\_lim}$ so that it is always greater than, or equal to, min_$\omega$, without affecting its sign.

min_$\omega$ is chosen to be high enough so that its inverse is small enough to be handled by the processor of the control unit.

The behaviour of $F(\hat{\omega}_m)$ for $\hat{\omega}_m=0$ can be achieved in several ways, for example by setting conditions such that either $\hat{\omega}_m$ is greater than, or less than zero, or $F(\hat{\omega}_m)$ is set to a constant $F_0$ which is calibrateable.

This prevents the speed estimate used in the position correction term from going to zero, which stops the correction term from tending towards infinity. The speed estimate term used in the rest of the algorithm is not affected.

With this modification, the algorithm can be run down to zero speed without going unstable. When the rotor is stationary, the algorithm will be stable. The position estimate will be constant, although its value will be random, and so it will have an error of any value up to ±180°.

With this modification to the position determining algorithm to limit the reciprocal of the speed estimate state, it is possible to start the motor up with the rotor position signal for the motor control being provided by the observer.

In order to start the motor from rest, the controller 42 is arranged to operate as follows.

1. With the rotor at standstill, the motor controller 42 is enabled. As the position signal is being provided by the observer 214, the motor position signal will be almost constant but will have a random error of up to ±180°.
2. A torque demand of reasonably high magnitude is generated. This could be in the form of a voltage demand for voltage controlled systems, or a current demand for purely current-controlled systems. In this embodiment it is the speed demand which is taken from the map of FIG. 2. In this case it is held constant for a fixed period to allow the observer to converge.
3. (a) If the initial value of the position signal happens to be within ±90° of the actual rotor position, the motor will turn in the correct direction. As the motor speed increases, the position signal produced by the sensorless algorithm will become more and more accurate, and the production of torque becomes more and more efficient, until the speed is high enough for normal operation.
   (b) If the initial value of the position signal happens to be greater than ±90° of the actual rotor position, the motor will start to turn in the wrong direction. As the motor speed increases, the position signal will converge on a steady position error close to 180° from true rotor position.
   (c) If the initial value of the position signal is close to ±90°, then the initial torque produced by the motor will be close to or equal to zero. However, the position signal will very quickly ramp in one direction until the position error is far enough away from ±90° to produce enough torque to turn the motor. The motor will then either proceed as in case (a) or (b) above.

Hence it can be seen that if the motor control is started up using the position-sensorless observer, the motor will start turning and the position signal will converge, even though the observer cannot correctly determine the position at zero speed. However, there is a 50% chance that the observer will converge on a position close to 180° from the true position, and the motor will rotate in the wrong direction.

Figure 12:
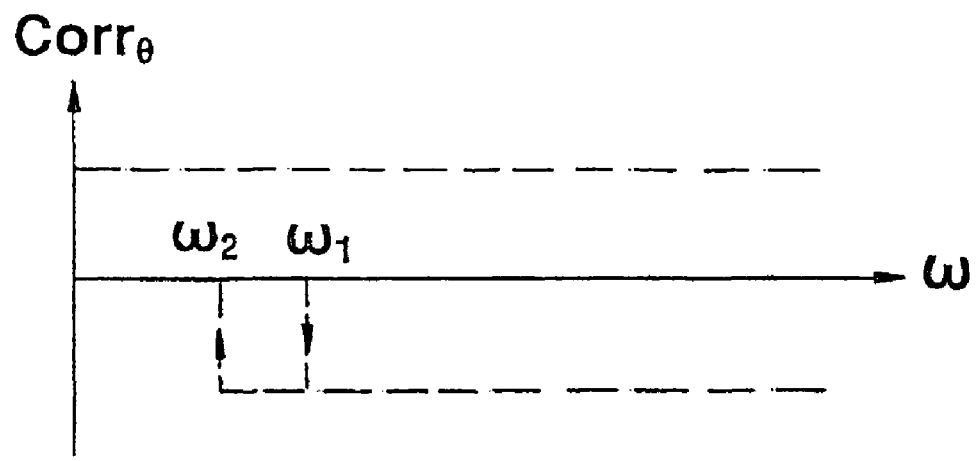

In order to overcome the convergence problem in this embodiment, at the instant that the motor control is enabled, a sufficiently large torque demand is applied to the motor to make it start up as described above. Referring to FIG. 12, at the same moment, the correction term applied to the position state is limited so that the correction can only be applied to correct the position in the direction that the motor is intended to turn. For example, if the torque demand is in the positive direction, then the position correction term is limited to be positive, i.e. between 0 and +∞. If the torque demand is in the negative direction, then the position correction term is limited to be negative, i.e. between −∞ and 0.

No matter what the initial position error is, the position correction term ensures that the applied voltages will rotate in the direction required. It therefore ensures that position will rotate in the direction required and the motor will start up and rotate in that direction.

The control unit 42 monitors the motor speed, and when it reaches a predetermined speed, as determined from the differential of the position, the limits are removed from the position correction term and the so that the observer works normally. Since the modified low speed sensorless algorithm does not provide optimum efficiency, but the normal algorithm does not function effectively at low speeds, the speed at which the switch is made is selected to be the lowest at which the normal algorithm can function reliably.

Figure 13:
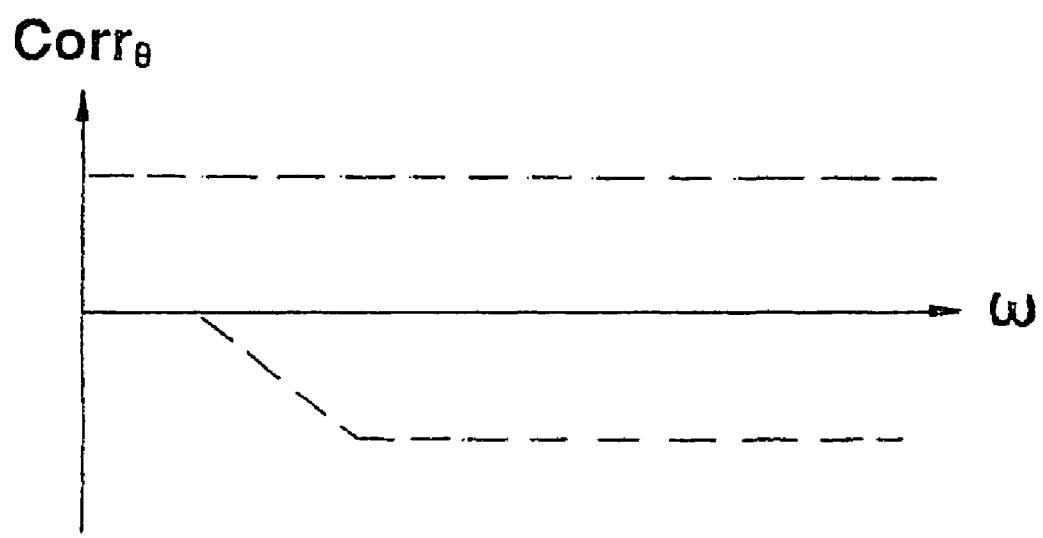
FIG. 13 is a graph showing limits on a position correction factor in a further embodiment of the invention.

The switch between the two regimes can carried out at a single speed threshold, but in this embodiment as shown in FIG. 12, for better performance hysteresis is applied, so that the switch from the low speed to the high speed regime as the speed increases occurs at a higher speed $\omega_1$ than the speed $\omega_2$ at which the switch takes place from the high speed to the low speed regime as the speed decreases. In an Alternative embodiment, as shown in FIG. 13, the limit to the position correction in the 'backward' direction, contrary to the desired direction, can be ramped out, increasing in magnitude with increasing motor speed.

In a further embodiment, the controller uses an alternative method of ensuring that the motor starts moving in the correct direction. In this embodiment the controller is arranged to start the motor by applying a constant torque demand as described above and, as the motor speed increases, check that it is turning in the required direction. The direction of rotation is determined by differentiating the motor position, as determined by the sensorless algorithm, to determine the motor speed. The algorithm is such that it is impossible for the position, as determined by the algorithm, to be rotating in one direction while the motor rotates in another, so it is guaranteed that the differentiated position will indicate whether the motor is running backwards.

If at any point the control unit detects that the motor is running backwards, it disables the motor control, and the motor is allowed to stop. When it is determined that the motor has stopped, either because sufficient time has been allowed for it to stop or because it is detected as being stationary the motor control is restarted and the torque demand re-applied. The motor can be detected as stationary when the differential of the position signal is below a predetermined threshold. This process is repeated until the motor is detected as running in the correct direction.

The advantage of using a predictor/compensator type of sensorless algorithm is that it compensates for a number of variable parameters that could otherwise affect the accuracy of the position estimation. Some of the parameters used in the algorithm equations will vary from one motor to another. These include, for example, motor phase resistance R, motor inductance L, motor mechanical viscosity B, motor mechanical inertia J, and the motor back emf and torque constants $K_e$ and $k_t$. If a predictor/compensator system were not used, then these parameters could be measured for each motor as it is produced and input individually into the sensorless algorithm. However, this is obviously time consuming and inconvenient. Some of the parameters will also vary with temperature, such as R, L and B. Again, if the predictor/compensator model were not used, then the temperature could be monitored and the equations of the algorithm modified to take the temperature into account. However, this makes the model significantly more complicated, which increases the computational overheads.

While the embodiment described above uses a non-linear observer, other closed loop observers such as a Luenberger observer or a Kalman filter can be used.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A control system for an electric motor comprising:
a control unit adapted to be connected to an electric motor and arranged to determine the position of the motor from at least one electrical parameter by means of a position determining algorithm which is included in the control unit, the algorithm being reliant on movement of the motor to determine a motor position, and to start up the motor from rest by applying voltages to the motor that are independent of the position of the motor, the position determining algorithm defining a model of the motor which includes a motor position state and which is arranged to estimate the motor position from at least one model input; the position determining algorithm including a corrector arranged to monitor an output of the model and compare it to a measured parameter thereby to determine a correction factor that can be input to the model, the correction factor being arranged to correct the motor position state of the model with the control unit being arranged to limit the sign of the correction factor at low motor speeds thereby to control the direction in which the motor will turn.

2. A system according to claim 1 wherein the algorithm defines an observer which is non-linear.

3. A system according to claim 1 wherein the control unit is arranged to monitor the direction of rotation of the motor after start up and, if it detects that the motor is rotating in the opposite direction to that desired, to stop the motor and restart it.

4. A system according to claim 1 wherein the control unit is arranged, at low motor speeds, to limit the magnitude of a term in the algorithm that varies with the inverse of the motor speed.

5. A system according to claim 4 wherein the control unit is arranged to at least partially remove the limit on said magnitude as the motor speed increases.

6. A system according to claim 1 wherein the control unit is arranged to produce an indicator of the motor position determined by the algorithm, and to determine the rotational speed of the motor from the indicator.

7. A system according to claim 6 wherein the control unit is arranged to differentiate the indicator to determine the rotational speed of the motor.

8. A system according to claim 1 wherein the control system also includes a DC link to which a DC link voltage is applied, and a drive stage controller arranged to connect the DC link to windings of the motor to control the motor, the drive stage controller being arranged to determine an electrical parameter of the windings from an electrical parameter of the DC link.

9. A system according to claim 8 wherein the electrical parameter is voltage.

10. A system according to claim 9 wherein the drive stage controller is arranged to connect the windings to the DC link using pulse width modulation control, and to determine the phase voltages from the DC link voltage and duty cycles of the PWM control.

11. A system according to claim 8 wherein the parameter is electric current.

12. A system according to claim 11 wherein the drive stage controller is arranged to open and close connections between each of the windings and the DC link, and to measure the current in one of the windings by measuring the current in the DC link at the times when that winding is connected to the DC link.

13. A system according to claim 1 wherein the control unit is arranged to receive inputs indicative of a vehicle parameter relating to operation of a vehicle, to determine a desired motor speed dependent on the vehicle parameter, and to control the speed of the motor to the desired motor speed.

14. A system according to claim 13 wherein the vehicle parameter is vehicle speed or steering rate.

15. A system according to claim 1 wherein the system includes a motor and is included in a power steering system.

\* \* \* \* \*